US005794322A

United States Patent [19]

Issagholian-Havai

[11] Patent Number: 5,794,322

[45] Date of Patent: Aug. 18, 1998

[54] TOOL FOR INSTALLING CLIP ON DUCT FLANGES

[76] Inventor: Robert Issagholian-Havai, 7239 Lonzo St., Tujunga, Calif. 91042

[21] Appl. No.: 519,741

[22] Filed: Aug. 28, 1995

[51] Int. Cl.$^{6}$ .............................. B23B 11/00

[52] U.S. Cl. .............................. 29/243.56; 285/39; 285/424

[58] Field of Search .............................. 285/39, 424; 29/243.56

[56] References Cited

U.S. PATENT DOCUMENTS 1,977,459 10/1934 Swortwood .............................. 29/243.56

4,398,334 8/1983 Kovalevich .............................. 29/243.56

4,579,375 4/1986 Fischer et al. .............................. 285/424 X 4,995,648 2/1991 Jackson .............................. 285/424 X 5,020,202 6/1991 Turrell .............................. 29/243.56

*Primary Examiner*—Dave W. Arola

*Attorney, Agent, or Firm*—Tod R. Nissle, P.C.

[57] ABSTRACT

A tool for clipping together a pair of flange connectors includes a handle and a clipping member. The clipping member is shaped and dimensioned to force a U-shaped clip over the flange connectors to secure the connectors together.

2 Claims, 3 Drawing Sheets

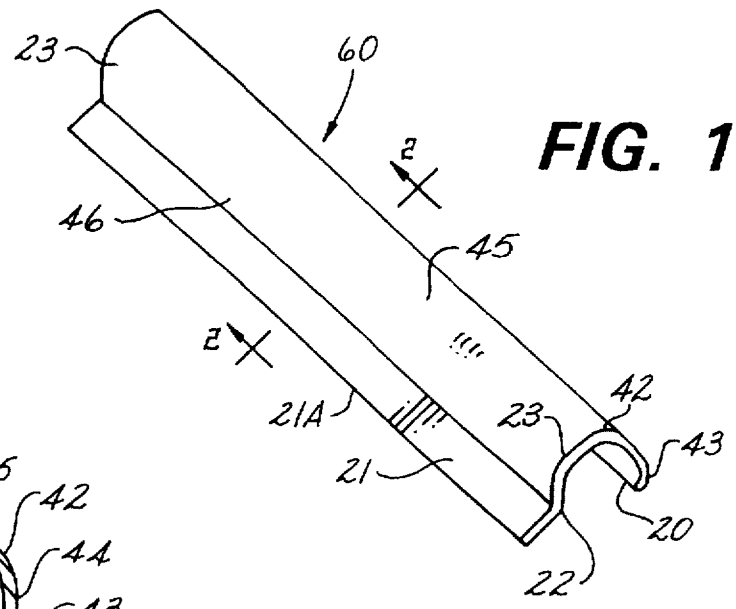
FIG. 1
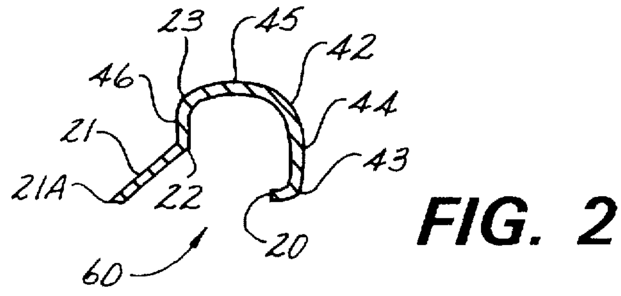
FIG. 2
FIG. 3
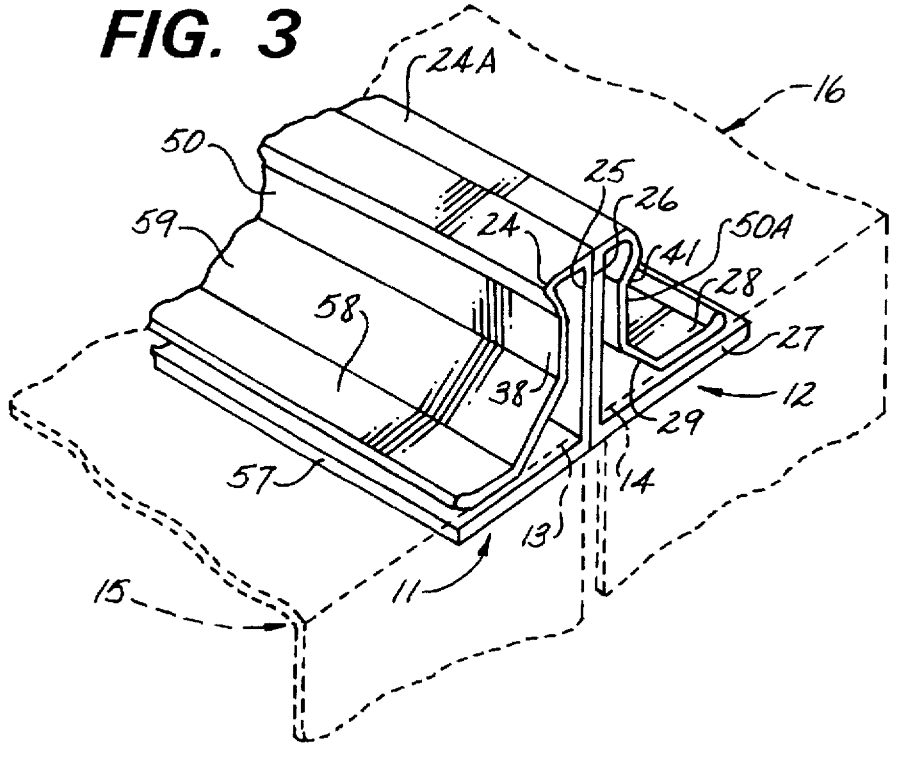

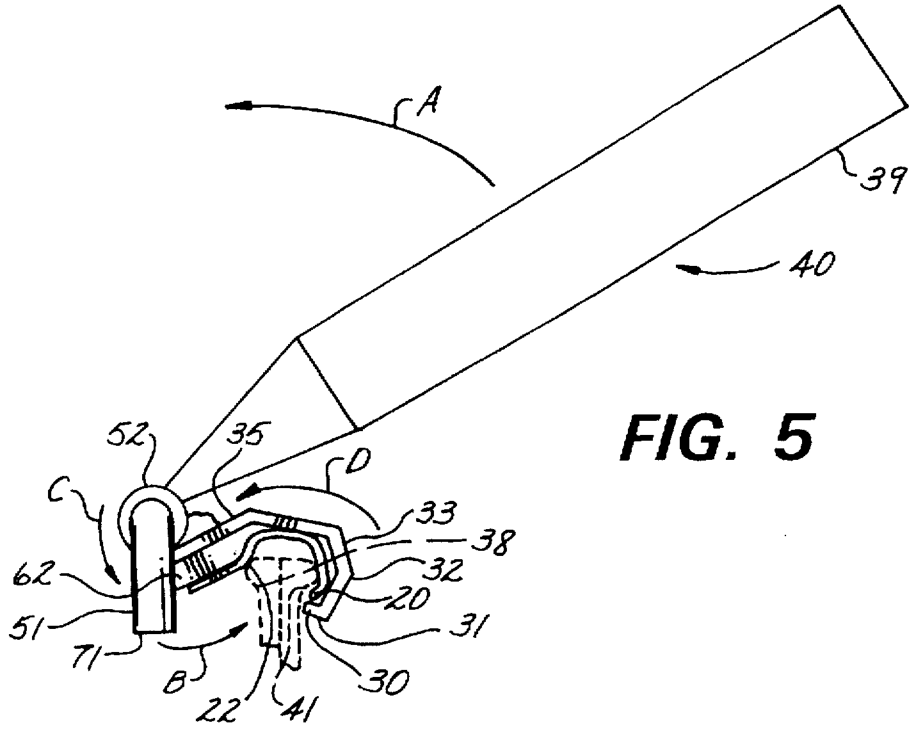
FIG. 5
FIG. 6
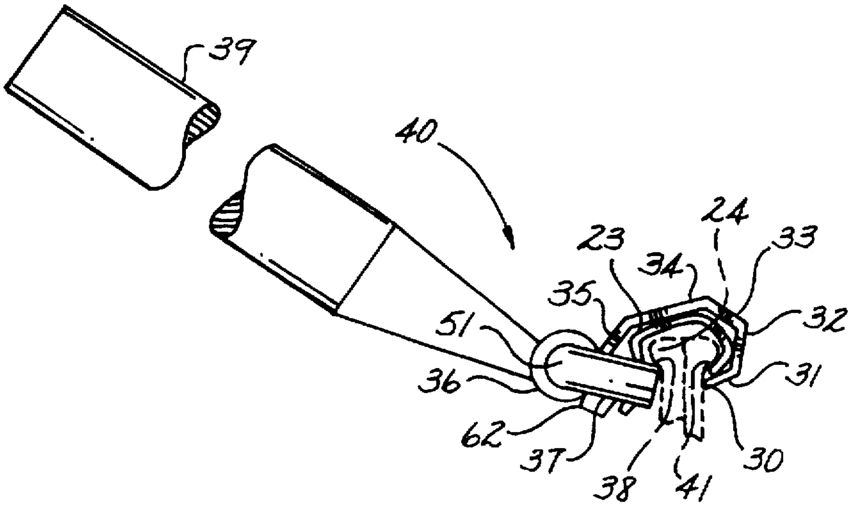

TOOL FOR INSTALLING CLIP ON DUCT FLANGES

This invention relates to a tool for clipping together a pair of flange connectors.

In another respect, the invention relates to a method for securing together a pair of opposing flange connectors attached to the adjacent ends of a pair of air conditioning ducts.

L-shaped flange connectors for air ducts are well known in the art. See, for example, U.S. Pat. Nos. 4,940 to Mez, 5,054,823 to Arnoldt, and 5,352,000 to Issagholian-Havai et al. The first leg of each of such L-shaped flange connectors receives the leading edge of the end of an air duct. The second leg is normal to the first leg and includes an elongate shoulder adapted to receive a U-shaped clip which secures the flange connector to an adjacent opposing flange connectors. One prior art U-shaped clip is identified by reference character 41 in FIG. 9 of U.S. Pat. No. 4,508,376 to Arnoldt. One problem encountered in the use of such U-shaped clips is the mounting of the clips over the shoulders of a pair of opposing L-shaped flange connectors. The clips are usually manually snapped into position or are pounded into position with a hammer. There are disadvantages associated with these procedures . First, if the clips are manually mounted on L-shaped flange connectors, the fit of the clips cannot be too tight, otherwise the force needed to install the flange connectors is too great. Second, if the clips are mounted on L-shaped flange connectors with a hammer, the clips may be bent or damaged.

Accordingly, it would be highly desirable to provide an improved apparatus and method for mounting a clip on a L-shaped flange, which improved method would permit a clip to be tightly mounted on and snugly secure a pair of opposing L-shaped flange connectors without requiring the use of a hammer.

Therefore, it is a principal object of the invention to provide an improved method and apparatus for securing together a pair of opposing connector flanges each of which is mounted on the end of an air duct.

A further object of the invention is to provide a method for securing tightly together with a clip a pair of opposing air duct connector flanges without requiring that a hammer be utilized to force the clip onto the duct connector flanges Another object of the invention is to provide an improved clip for securing together an opposing pair of air duct connector flanges.

These and other, further and more specific objects and advantages of the invention will be apparent to those skilled in the art from the following detailed description thereof, taken in conjunction with the drawings, in which:

FIG. 1 is a perspective view illustrating a clip which is constructed in accordance with the principles of the invention and which is utilized to secure together an opposing pair of air duct flanges;

FIG. 2 is a section view of the clip of FIG. 1 taken along section line 2—2 and further illustrating construction details thereof;

FIG. 3 is a perspective view illustrating an opposing pair of L-shaped air duct flanges each mounted on the end of an air duct;

FIG. 5 is an end view of the flanges, clip and tool of FIG. 4 illustrating further construction details thereof; and, FIG. 6 is a side view of the flanges, clip and tool of FIGS. 4 and 5 after the tool has been manually operated to snap the clip over the shoulders of the opposing pair of L-shaped flanges.

Figure 4:
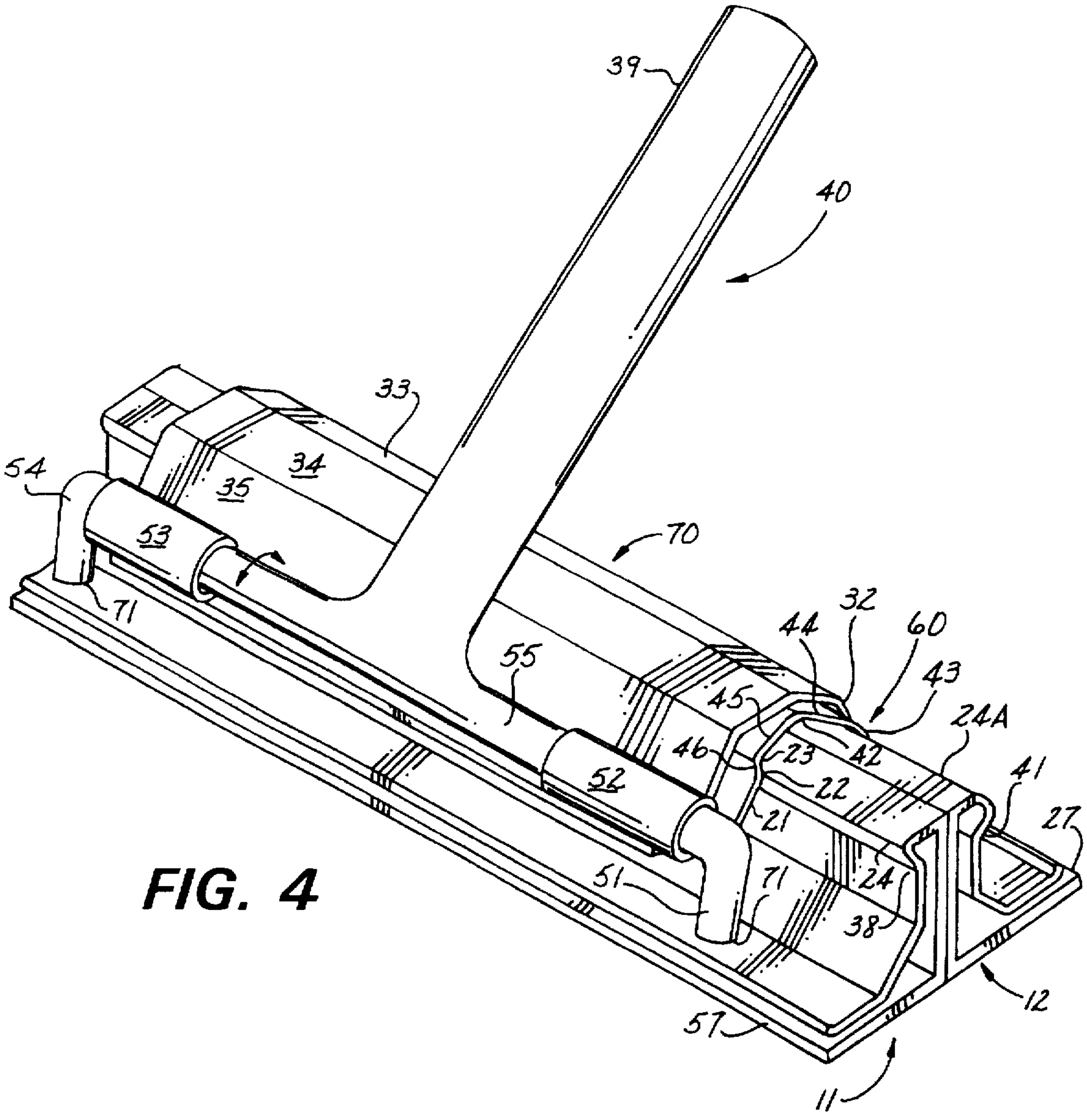
FIG. 4 is a perspective view illustrating the clip of FIG. 1 and an installation tool constructed in accordance with the invention, the clip and tool being positioned on an opposing pair of L-shaped air duct flanges in a position to utilize the tool to snap the clip into a locking position over the-shoulders of the opposing pair of L-shaped air duct flanges.

Briefly, in accordance with our invention, we provide a tool for snapping an elongate U-shaped clip onto first and second opposing elongate air duct flanges. Each flange includes a support for receiving the edge of the end of an air duct, and a shoulder connected to and spaced apart from the support. The clip has first and second elongate edges and includes at least one bend intermediate the edges and a leg extending outwardly from the bend. The clip is positioned on the pair of duct flanges such that the first elongate edge is beneath the shoulder of the first flange, and the bend is positioned on the shoulder of the second flange. The tool is positioned on the flanges and includes a generally U-shaped portion extending over the clip. The shaped portion includes a first edge positioned beneath the shoulder of the first flange, and a first portion contacting the leg of the clip. A member is attached to the first portion to pivot beneath and against the lip of the second flange to force the first portion against the leg of the clip to force the bend over the shoulder of the second flange and snap the shoulder into position beneath the second shoulder.

Turning now to the drawings, which depict the presently preferred embodiment of the invention for the purpose of illustrating the practice thereof and not by way of limitation of the scope of the invention, and in which like reference characters refer to corresponding elements throughout the several views, FIGS. 1 and 2 illustrate an elongate generally U-shaped clip 60 constructed in accordance with the principles of the invention and including a first elongate straight edge 20 and a second elongate straight edge 21A. Elongate generally flat leg 21 is integrally connected to elongate generally flat section 46 by bend 22. Section 46 is connected to elongate generally flat section 45 by bend 23. Section 45 is connected to elongate generally flat section 44 by bend 42. Bend 43 extends between section 44 and edge 20.

FIG. 3 illustrates a pair of identical adjacent opposing L-shaped flanges 11 and 12. Flange 11 includes elongate flat leg 57 connected and normal to upstanding leg 25. Shoulder 24 is integrally attached to and extends outwardly from leg 25. Elongate flat panel 50 is integrally attached to and extends downwardly from shoulder 24 and parallel to leg 25. Elongate flat panel 59 is integrally attached to and canted with respect to panel 50. Elongate panel 58 is integrally attached to and at an angle with respect to panel 59. Panels 58, 59, 50 and shoulder 24 collectively form a spring member which is resiliently forced away from leg 57 when the leading lead 13 of a rectangular air conditioning duct 15 is slid intermediate panels 57 and 58. The points along which panel 50 is connected to shoulder 24 collectively form a recess or hollow 38 beneath shoulder 24.

Flange 12 includes elongate flat leg 27 connected and normal to upstanding leg 26. Shoulder 24A is integrally attached to and extends outwardly from leg 26. Elongate flat panel 50A is integrally attached to and extends downwardly from shoulder 24A and parallel to leg 26. Elongate flat panel 29 is integrally attached to and canted with respect to panel 50A. Elongate panel 28 is integrally attached to and at an angle with respect to panel 29. Panels 28, 29, 50A and shoulder 24A collectively form a spring member which is resiliently forced away from leg 27 when the leading edge 14 of a rectangular air conditioning duct 16 is slid intermediate panels 27 and 28. The points along which panel 50A is connected to shoulder 24A form a recess or hollow 41 beneath shoulder 24A. As is well known in the art, before flanges 11 and 12 are clipped together, a gasket or other sealing means can be interposed between legs 25 and 26.

The tool 40 utilized in the practice of the invention is illustrated in FIGS. 4 to 6 and includes handle 39 fixedly attached to elongate cylindrical rod 55 which rotatably extends through hollow cylindrical sleeves 52 and 53. Cylindrical feet 51 and 54 are integrally attached and normal to rod 55. Sleeves 52 and 53 are fixedly attached to elongate flat panel member 35. Panel member 35 is canted with respect to and integrally attached to elongate flat panel member 34. Panel member 34 is canted with respect to and integrally attached to elongate flat panel member 33. Panel member 33 is canted with respect to and integrally attached to elongate flat panel member 32. Panel member 33 is canted with respect to and integrally attached to elongate flat panel member 31 having elongate linear edge 30. The clip engaging portion 70 of tool 40 consists of panel members 31 to 35.

FIGS. 4 and 5 illustrate the clip 60 and tool 40 of the invention initially installed on flanges 11 and 12 before tool 40 is utilized to force clip 60 into position over the shoulders 24 and 24A of the flanges 11, 12. As can be seen in FIG. 5, edge 20 of clip 60 and edge 30 of tool 40 are positioned in the recess 41 under shoulder 24A of flange 12. Clip 60 extends over shoulders 24 and 24A such that bend 22 sets on and extends along shoulder 24 of flange 11. Panel members 31 to 35 of tool 40 extend over clip 60. Elongate resilient member 51 is attached to the underside of panel 35 and bears against leg 21. Member 51 is as long as panel member 35 and has a substantially rectangular cross section. Clip 60 and tool 40 can be mounted in the position shown in FIG. 5 by first putting clip 60 on flanges 11 and 12 in the position shown and by then sliding tool 40 longitudinally over clip 60 to the position shown in FIGS. 4 and 5. Or, clip 60 can be loaded into engaging portion 70 by longitudinally sliding clip 60 into portion 70, after which the clip 60 and tool 40 are simultaneously mounted on flanges 11 and 12 in the position shown in FIGS. 4 and 5.

Once tool 40 and clip 60 are in the position shown in FIGS. 4 and 5, clip 60 is snapped over shoulders 24 and 24A by grasping and pivoting handle 39 in the direction of arrow A in FIG. 5. When handle 39 pivots in the direction of arrow A, rod 55 and feet 51 and 54 rotate in sleeves 52 and 53 in the direction of arrow C, which causes the distal ends 71 of feet 51 and 54 to move in the direction of arrow B into the recess 38 beneath shoulder 24 of flange 11. Once ends 71 are seated in recess 38, the continuing movement of handle 39 in the direction of arrow A causes portion 70 of tool 40 to pivot about edge 30 in the direction of arrow D, and causes distal ends 71 to pivot in recess 38. When portion 70 pivots about edge 30, shoulder 24A prevents edge 30 from moving upwardly and outwardly away from edge 14 and panel 27. Similarly, after distal ends 71 seat in recess 38, shoulder 24 prevents ends 71 from moving upwardly and outwardly away from edge 13 and panel 57 as ends 71 pivot in recess 38 and function to pull panel 35 of portion 70 toward panel 57.

The pivoting of portion 70 about edge 30 in the direction of arrow D after ends 71 seat in recess 38 displaces member 62 against leg 21 and forces clip 60 to pivot about edge 20 in the direction of arrow D. The pressure against leg 21 by member 62 causes clip 60 to resiliently expand so that the distance between bend 22 and edge 20 is momentarily increased to permit bend 22 to slid over shoulder 24 and into recess 38. After bend 22 snaps into recess 38, clip 60 resiliently contracts, reducing the distance between bend 22 and edge 20 to the normal distance shown in FIG. 2. FIG. 6 illustrates clip 60 after bend 22 has been snapped into recess 38. In FIG. 6, bend 22 is not visible because it is obscured by foot 51.

After tool 40 is operated to mount clip 60 in the position shown in FIG. 6, tool 40 is lifted off or longitudinally slid off of clip 60.

One advantage of the clip 60 and tool 40 of the invention is that the torque generated by manually moving handle 39 in the direction of arrow A in FIG. 5 permits quick installation of clip 60 with minimal exertion. Another advantage is that the use of tool 40 protects clip 60 and minimizes the risk that clip 60 will be damaged during installation. Still another advantage is that the torque generated by tool 40 against clip 60 permits clip 60 to be shaped and dimensioned such that it fits closely and snugly about shoulders 24 and 24A and tightly forces shoulders 24 and 24A against one another (or against a gasket) after clip 60 is installed.

As would be appreciated by those of skill in the art, flanges 11 and 12 can be arcuate and shaped to receive the leading edge of a circular or oval duct, and, portion 70 of tool 40 can also be arcuate to facilitate the installation of an arcuate clip on an arcuate length of flanges 11 and 12. Cylindrical rod 55 can also, if desired, be bent along an arc.

The shape and dimension of tool 40 and clip 60 can be varied as long as tool 40 functions to engage flanges 11 and 12 and clip 60 to snap clip 60 over shoulders 24 and 24A to hold shoulders 24 and 24A in a position adjacent one another.

Having described my invention in such terms as to enable those skilled in the art to understand it and practice it, and having described the presently preferred embodiment thereof,

I claim:

1. A tool for positioning a spring clip to anchor an adjacent, opposing pair of sheet metal extensions, said tool comprising
   (a) a generally U-shaped portion (60) positioned on and extending over the spring clip and including
      (i) a first member (31) for engaging one of the sheet metal extensions, and
      (ii) a second member (35, 62) for, when said first member engages one of the sheet metal extensions, positioning adjacent another of the sheet metal extensions
         to extend laterally outwardly away from both of the sheet metal extensions, and
         to contact the spring clip; and,
   (b) pivot means attached to the U-shaped portion for pivoting beneath and pressing against the other of the sheet metal extensions for displacing said second member against the spring clip at points spaced laterally from the other of the sheet metal extensions for forcing the clip over the other of the sheet metal extensions.

2. The tool of claim 1 wherein said pivot means includes
   (i) a handle (39), and
   (ii) at least one contact member (51) attached to said handle, said contact member (51) and handle being pivotable simultaneously to press
      said contact member (51) against the other of the sheet metal extensions, and
      said second member (35, 62) against the extension portion of the clip at points spaced laterally from the other of the sheet metal extensions and force the clip over the other of the sheet metal extensions.

* * * * *